United States Patent
Zhou et al.

(10) Patent No.: US 12,066,587 B2
(45) Date of Patent: Aug. 20, 2024

(54) METHOD FOR EXTRACTING IP INFORMATION FROM GROUNDED-WIRE TRANSIENT ELECTROMAGNETIC RESPONSE

(71) Applicant: INSTITUTE OF GEOLOGY AND GEOPHYSICS CHINESE ACADEMY OF SCIENCES (IGGCAS), Beijing (CN)

(72) Inventors: Nannan Zhou, Beijing (CN); Kangxin Lei, Pingyao County (CN); Guoqiang Xue, Beijing (CN); Wen Chen, Beijing (CN)

(73) Assignee: INSTITUTE OF GEOLOGY AND GEOPHYSICS CHINESE ACADEMY OF SCIENCES (IGGCAS), Beijing (CN)

(*) Notice: Subject to any disclaimer, the term of this patent is extended or adjusted under 35 U.S.C. 154(b) by 382 days.

(21) Appl. No.: 17/375,255

(22) Filed: Jul. 14, 2021

(65) Prior Publication Data

US 2021/0341638 A1   Nov. 4, 2021

Related U.S. Application Data

(63) Continuation of application No. PCT/CN2020/108532, filed on Aug. 11, 2020.

(30) Foreign Application Priority Data

Sep. 5, 2019   (CN) .................. 201910835740.X (51) Int. Cl.
    *G01V 3/08* (2006.01)

(52) U.S. Cl.
    CPC ........ *G01V 3/083* (2013.01); *G01V 2003/086* (2013.01)

(58) Field of Classification Search
    CPC ..... G01V 3/083; G01V 2003/086; G01V 3/12
    See application file for complete search history.

(56) References Cited

FOREIGN PATENT DOCUMENTS

| CA | 2468896 C | * | 2/2013 | ............. G01V 3/083 |
| CN | 101520517 A | * | 9/2009 | |

(Continued)

OTHER PUBLICATIONS

CN-102053281-A_Translated (Year: 2011).*

(Continued)

*Primary Examiner* — Manish S Shah
*Assistant Examiner* — Michael J Singletary
(74) *Attorney, Agent, or Firm* — Piloff Passino & Cosenza LLP; Rachel K. Piloff; Sean A. Passino (57) ABSTRACT

Disclosed is a method for extracting IP information in a TEM response of a grounded-wire source, comprising the following steps: 1) obtaining subsurface resistivity through inversion of a vertical magnetic field less influenced by an IP effect; 2) obtaining an electric field response not influenced by the IP effect based on forward modeling of the obtained underground electrical structure; 3) removing the influence of the IP effect on an observed response to obtain a pure IP response; and 4) inverting the obtained IP response to obtain IP information of polarizability, a frequency dependence, and a time constant. The method of the present invention provides a new idea for further extracting IP information in a TEM response.

4 Claims, 8 Drawing Sheets

(56) References Cited

FOREIGN PATENT DOCUMENTS

CN 102053281 A * 5/2011
WO WO-2010047613 A1 * 4/2010 ............... G01V 3/38

OTHER PUBLICATIONS

CN-101520517-A_Translated (Year: 2009).*
CA-2468896-C_Translated (Year: 2013).*
WO-2010047613-A1_Translated (Year: 2010).*

* cited by examiner

METHOD FOR EXTRACTING IP INFORMATION FROM GROUNDED-WIRE TRANSIENT ELECTROMAGNETIC RESPONSE

CROSS REFERENCE TO RELATED APPLICATION

The present invention belongs to the technical field of transient electromagnetic (TEM) method, and relates to a method for extracting induced polarization (IP) information from a transient electromagnetic response of a grounded-wire source.

BACKGROUND OF THE INVENTION

The transient electromagnetic (TEM) method is an important branch of geophysics and plays an important role in the exploration of metal minerals and geothermal resources. However, when there are polarization bodies in the subsurface, the measured TEM data contain the influence of induced polarization effect (IP effect), and data distortion and sign reversal may occur in serious cases. It is particularly important to accurately analyze the influence rule of IP effect and invert the TEM data containing an IP effect.

The TEM can be divided into loop-source (magnetic source) and grounded-wire (electrical source) methods according to the form of field source. The analysis of the IP effect of loop-source TEM can be traced back to 1980. The primary problem to be solved is how to eliminate the influence of IP effect and further achieve the inversion of TEM data containing an IP effect after recognizing the change rule of a response caused by IP. The research on IP effect in a TEM response of a grounded-wire source is relatively few. In contrast to the previous IP inversion based on direct current (DC) data, the following method provide a high accuracy: obtaining IP information from the observed TEM data of grounded-wire source, inverting resistivity by an early transient response, then performing forward modeling to obtain a TEM response in the observation time range, removing the electromagnetic response from the observation data to obtain an IP response, and further inverting to obtain IP information. However, unlike the loop-source TEM method that can be only used for the observation of the vertical magnetic field or time derivative, a major advantage of the grounded-wire TEM method lies in that it can also be used for the observation of a horizontal electric field component, since the horizontal electric field component has a strong ability to distinguish high resistivity and good conductivity targets. The difference in the detection ability of different electromagnetic components is closely related to the polarization types. Then, the influence of IP effect on different components will also differ depending on different polarization types.

In order to recognize more clearly the essential reasons of different components influenced by the IP effect, the TE and TM polarization fields are extracted from a TEM response of a grounded-wire source on the layered earth surface, and then forwardly modeled to analyze the rules of different types of polarization fields influenced by the IP effect. Then, the characteristics of different components influenced by the IP effect are given, which provides a new method for extracting IP information from the observed TEM data.

SUMMARY OF THE INVENTION

The purpose of the present invention is to provide a method for extracting IP information in a TEM response of a grounded-wire source.

The specific technical solution of the present invention is as follows:

A method for extracting IP information in a TEM response of a grounded-wire source, comprising the following steps:
1) obtaining subsurface resistivity through inversion of a vertical magnetic field less influenced by an IP effect;
2) obtaining an electric field response not influenced by the IP effect based on forward modeling of the obtained underground electrical structure;
3) removing the influence of the IP effect on an observed response to obtain a pure IP response; and
4) inverting the obtained IP response to obtain IP information of polarizability, a frequency dependence, and a time constant.

Further, the grounded-wire TEM method is mainly used for the observation of horizontal electric field and vertical magnetic field, and the expression on surface of uniform layered earth is given as follows:

$$E_x = -\frac{I}{4\pi}\left[\frac{x}{r}\int_0^\infty \left[(1-r_{TM})\frac{u_0}{\hat{y}_0} - (1+r_{TE})\frac{\hat{z}_0}{u_0}\right]J_1(\lambda r)d\lambda\right]_{R'}^{R} - \quad (1)$$

$$\frac{\hat{z}_0 I}{4\pi}\int_{-L}^{L}\int_0^\infty (1+r_{TE})\frac{\lambda}{u_0}J_0(\lambda r)d\lambda dx'$$

$$H_z = \frac{I}{4\pi}\int_{-L}^{L}\frac{y}{r}\int_0^\infty (1+r_{TE})e^{u_0 z}\frac{\lambda^2}{u_0}J_1(\lambda r)d\lambda dx' \quad (2)$$

where, r is distance from a source to an observation point, R and R' are distances from two grounding electrodes to the observation point, 2 L is length of an emission source, $J_1(\lambda r)$ and $J_0(\lambda r)$ are the first-order and zero-order Bessel functions of the first kind respectively, $\lambda$ is a variable related to wave number, $$r_{TE} = \frac{Y_0 - \hat{Y}_1}{Y_0 + \hat{Y}_1}$$

is a reflection coefficient of electromagnetic wave when an electric field component is incident on a plane, $$r_{TM} = \frac{Z_0 - \hat{Z}_1}{Z_0 + \hat{Z}_1}$$

is a reflection coefficient of electromagnetic wave when a vertical magnetic field is incident on a plane, $$Y_0 = \frac{u_0}{\hat{z}_0}$$

is intrinsic admittance of a free space, $\hat{Y}_1$ is subsurface admittance, $$Z_0 = \frac{u_0}{\hat{y}_0}$$

is intrinsic impedance of a free space, $\hat{Z}_1$ is subsurface impedance (the subsurface impedance and the subsurface admittance are recursively obtained from the bottom layer), $\hat{z}_0 = i\omega\mu_0$, $\hat{y}_0 = i\omega\varepsilon_0$; $\omega$ is angular frequency, i is a complex number, $\varepsilon_0$ is a dielectric coefficient of a uniform underground half-space, and $\mu_0$ is permeability of the uniform underground half-space.

$$\hat{Y}_j = Y_j \frac{\hat{Y}_{j+1} + Y_j \tanh(u_j h_j)}{Y_j + \hat{Y}_{j+1} \tanh(u_j h_j)};$$

$$\hat{Y}_N = Y_N;$$

$$\hat{Z}_j = Z_j \frac{\hat{Z}_{j+1} + Z_j \tanh(u_j h_j)}{Z_j + \hat{Z}_{j+1} \tanh(u_j h_j)};$$

$$\hat{Z}_N = Z_N;$$

$$j = N-1, N-2, \ldots, 1$$

Taking $r_{TE}$ and $r_{TM}$ as the basis for judging a TE polarization field and a TM polarization field, the vertical magnetic field includes the TE polarization field only in the response observed on the layered earth surface, while the horizontal electric field includes both the TM polarization field generated by the grounding term and the TE polarization field excited by the grounding term and the wire source. In order to analyze the different polarization types influenced by the IP effect, taking the horizontal electric field as an example, the expressions of the TE field and the TM field contained therein are extracted respectively.

$$E_{x-TE} = \frac{I}{4\pi} \left[ \frac{x}{r} \int_0^\infty (1 + r_{TE}) \frac{\hat{z}_0}{u_0} J_1(\lambda r) d\lambda \right]_{R'}^R - \frac{\hat{z}_0 I}{4\pi} \int_{-L}^L \int_0^\infty (1 + r_{TE}) \frac{\lambda}{u_0} J_0(\lambda r) d\lambda dx' \quad (3)$$

$$E_{x-TM} = -\frac{I}{4\pi} \left[ \frac{x}{r} \int_0^\infty (1 - r_{TM}) \frac{u_0}{\hat{y}_0} J_1(\lambda r) d\lambda \right]_{R'}^R \quad (4)$$

For a polarization layer, resistivity is converted into complex resistivity by a Cole-Cole model, the most classical and commonly used polarization model in the study of IP effects, which has been widely proven to effectively reflect the IP characteristics of the polarized earth. The (dispersion) complex resistivity of the Cole-Cole model can be expressed as:

$$\rho(i\omega) = \rho_0 \left[ 1 - m \left( 1 - \frac{1}{1 + (i\omega\tau)^c} \right) \right] \quad (5)$$

where, $\rho(i\omega)$ is dispersion resistivity including the IP effect, $\rho 0$ is zero-frequency resistivity, and m is charge rate or polarizability of a medium; the charge rate affects the intensity of the frequency spectrum rather than the morphology thereof, and is mainly influenced by the metal mineral content, mineral density and impregnation degree; $\tau$ is a time constant, which mainly affects the phase of spectral extreme values and is most influenced by compactness, burial depth and size of ore body under certain conditions; c is a frequency dependence, which determines the expressivity of spectrum characteristics and is mainly affected by burial depth of ore body; a TEM response of an electric-couple source with IP information is obtained through forward modeling of electric-couple source TEM method with the IP effect (forward modeling of firstly solving the frequency-domain electromagnetic method of the same device), replacing the DC resistivity of the formation with the complex resistivity of the Cole-Cole model in the frequency domain, and then performing the sine transform.

The TE and the TM fields of the grounded-wire TEM are calculated as per Formulae (3) and (4), respectively; and the geoelectric model without a polarization layer is:

$H: \rho_1=100\ \Omega\cdot m, h_1=500m; \rho_2=10\ \Omega\cdot m, h_2=20m; \rho 3=200\ \Omega\cdot m.$ Further, the above parameters take values in the range of: $\rho 0=10^{-4}$ to $10^5$ $\Omega\cdot m$, m=0 to 0.98, $\tau=10^{-3}$ to $10^5$ s, and c=0.1 to 0.6.

Further, for the geoelectric model with a polarization layer, the second layer is the polarization layer, and the polarization parameters are set as: m=0.1, $\tau=1$ s, and c=0.3; the emission source is 1000 m long, and the emitting current is 10 A.

Compared with the prior art, the present invention has the following advantageous effects:

According to the present invention, the influence of IP effect of polarization body on two types of fields is calculated through theoretical simulation. The result shows that the IP effect has a far greater influence on the TM field than on the TE field. The influence of IP effect of polarization body on a horizontal electric field and a vertical magnetic field commonly used in empirical measurement is further analyzed as follows: the horizontal electric field containing the field TE and the TM field is much more influenced by the IP effect than the vertical magnetic field containing the TE field only under the same background model, and the influence of IP effect is more obvious for the double-line grounded-wire TEM dominated by the TM field. These conclusions have been verified through the empirical measurements at the Cu—Ni ore concentrated area in Karatungk, Xinjiang, which provides a new idea for further extracting IP information in a TEM response.

DETAILED DESCRIPTION OF THE PREFERRED EMBODIMENTS

The technical solution of the present invention will be further described below with reference to the embodiments.

A grounded-wire source TEM method is mainly used for the observation of a horizontal electric field and a vertical magnetic field, and the expression on surface of uniform layered earth is given as follows:

$$E_x = -\frac{I}{4\pi}\left[\frac{x}{r}\int_0^\infty \left[(1-r_{TM})\frac{u_0}{\hat{y}_0} - (1+r_{TE})\frac{\hat{z}_0}{u_0}\right]J_1(\lambda r)d\lambda\right]_{R'}^{R} - \quad (1)$$
$$\frac{\hat{z}_0 I}{4\pi}\int_{-L}^{L}\int_0^\infty (1+r_{TE})\frac{\lambda}{u_0}J_0(\lambda r)d\lambda dx'$$

$$H_z = \frac{I}{4\pi}\int_{-L}^{L}\frac{y}{r}\int_0^\infty (1+r_{TE})e^{u_0 z}\frac{\lambda^2}{u_0}J_1(\lambda r)d\lambda dx' \quad (2)$$

where, r is distance from a source to an observation point, R and R' are distances from two grounding electrodes to the observation point, 2 L is length of an emission source, $J_1(\lambda r)$ and $J_0(\lambda r)$ are the first-order and zero-order Bessel functions of the first kind respectively, $\lambda$ is a variable related to wave number, $$r_{TE} = \frac{Y_0 - \hat{Y}_1}{Y_0 + \hat{Y}_1}$$

is a reflection coefficient of electromagnetic wave when an electric field component is incident on a plane, $$r_{TM} = \frac{Z_0 - \hat{Z}_1}{Z_0 + \hat{Z}_1}$$

is a reflection coefficient of electromagnetic wave when a vertical magnetic field is incident on a plane, $$Y_0 = \frac{u_0}{\hat{z}_0}$$

is intrinsic admittance of a free space, $\hat{Y}_1$ is subsurface admittance, $$Z_0 = \frac{u_0}{\hat{y}_0}$$

is intrinsic impedance of a free space, $\hat{Z}_1$ is subsurface impedance (the subsurface impedance and the subsurface admittance are recursively obtained from the bottom layer), $\hat{z}_0 = i\omega\mu_0$, $\hat{y}_0 = i\omega\varepsilon_0$; $\omega$ is angular frequency, i is a complex number, $\varepsilon_0$ is a dielectric coefficient of a uniform underground half-space, and $\mu_0$ is permeability of the uniform underground half-space.

$$\hat{Y}_j = Y_j\frac{\hat{Y}_{j+1} + Y_j\tanh(u_j h_j)}{Y_j + \hat{Y}_{j+1}\tanh(u_j h_j)};$$

$$\hat{Y}_N = Y_N;$$

$$\hat{Z}_j = Z_j\frac{\hat{Z}_{j+1} + Z_j\tanh(u_j h_j)}{Z_j + \hat{Z}_{j+1}\tanh(u_j h_j)};$$

$$\hat{Z}_N = Z_N;$$

$$j = N-1, N-2, \ldots, 1$$

Taking $r_{TE}$ and $r_{TM}$ as the basis for judging a TE polarization field and a TM polarization field, the vertical magnetic field includes the TE polarization field only in the response observed on the layered earth surface, while the horizontal electric field includes both the TM polarization field generated by the grounding term and the TE polarization field excited by the grounding term and the wire source. In order to analyze the different polarization types influenced by the IP effect, taking the horizontal electric field as an example, the expressions of the TE field and the TM field contained therein are extracted respectively.

$$E_{x-TE} = \frac{I}{4\pi}\left[\frac{x}{r}\int_0^\infty (1+r_{TE})\frac{\hat{z}_0}{u_0}J_1(\lambda r)d\lambda\right]_{R'}^{R} - \quad (3)$$
$$\frac{\hat{z}_0 I}{4\pi}\int_{-L}^{L}\int_0^\infty (1+r_{TE})\frac{\lambda}{u_0}J_0(\lambda r)d\lambda dx'$$

$$E_{x-TM} = -\frac{I}{4\pi}\left[\frac{x}{r}\int_0^\infty (1-r_{TM})\frac{u_0}{\hat{y}_0}J_1(\lambda r)d\lambda\right]_{R'}^{R} \quad (4)$$

For a polarization layer, resistivity is converted into complex resistivity by a Cole-Cole model, the most classical and commonly used polarization model in the study of IP effects, which has been widely proven to effectively reflect the IP characteristics of the polarized earth. The (dispersion) complex resistivity of the Cole-Cole model can be expressed as:

$$\rho(i\omega) = \rho_0\left[1 - m\left(1 - \frac{1}{1+(i\omega\tau)^c}\right)\right] \quad (5)$$

where, $\rho(i\omega)$ is dispersion resistivity including the IP effect, $\rho 0$ is zero-frequency resistivity, and m is charge rate or polarizability of a medium; the charge rate affects the intensity of the frequency spectrum rather than the morphology thereof, and is mainly affected by the metal mineral content, mineral density and impregnation degree; $\tau$ is a time constant, which mainly affects the phase of spectral extreme values and is most influenced by compactness, burial depth and size of ore body under certain conditions; c is a frequency dependence, which determines the expressivity of spectrum characteristics and is mainly affected by burial depth of ore body; the above parameters take values in the range of: $\rho_0 = 10^{-4}$ to $10^5$ $\Omega\cdot$m, m=0 to 0.98, $\tau = 10^{-3}$ to $10^5$ s, and c=0.1 to 0.6; a TEM response of an electric-couple source with IP information is obtained through forward modeling of electric-couple source TEM method with the IP effect (forward modeling of firstly solving the frequency-domain electromagnetic method of the same device), replacing the DC resistivity of the formation with the complex resistivity of the Cole-Cole model in the frequency domain, and then performing the sine transform.

The TE field and the TM field in the grounded-wire source TEM are calculated as per Formulae (3) and (4), respectively; and the geoelectric model without a polarization layer is:

$H: \rho_1=100\ \Omega\cdot m, h_1=500m; \rho_2=10\ \Omega\cdot m, h_2=20m; \rho_3=200\ \Omega\cdot m.$ For the geoelectric model with a polarization layer, the second layer is the polarization layer, and the polarization parameters are set as: m=0.1, τ=1 s, and c=0.3. The emission source is 1000 m long, and the emitting current is 10 A. Taking the observation point (500, 1000) as an example, the influence of IP effect on different types of fields is analyzed.

Figure 1:
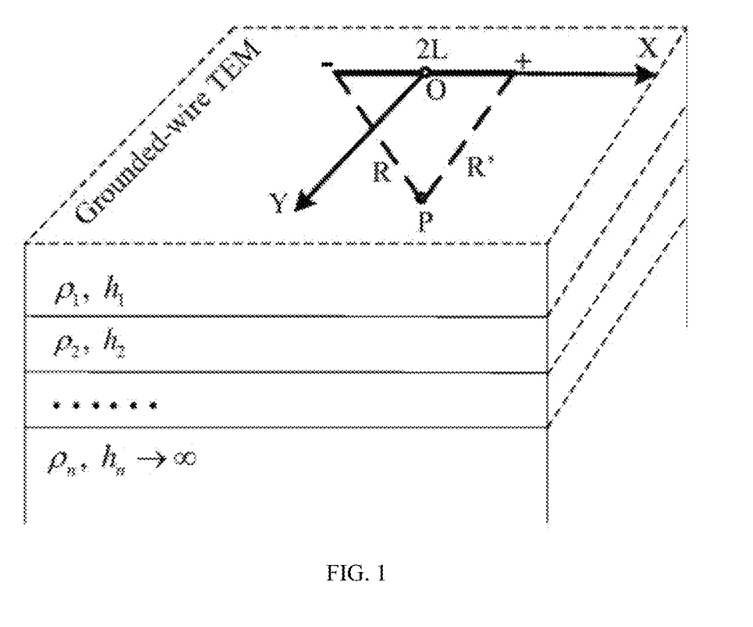
FIG. 1 is a schematic diagram of an observation mode of TEM response of grounded-wire source.
Figures 2A, 2B:
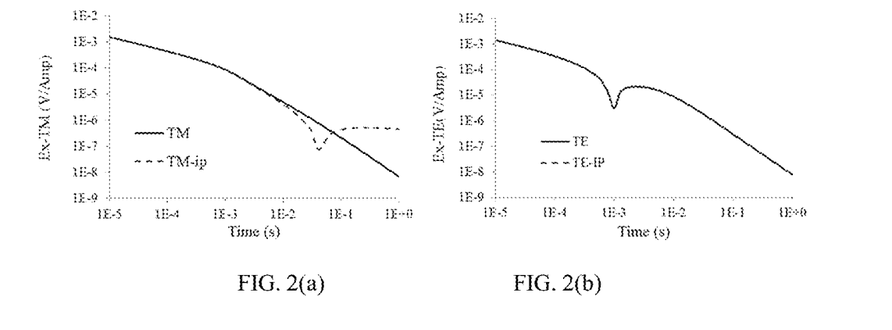
FIGS. 2(a)-(b) show a change of a response of different TE and TM fields (low resistivity polarization layer) influenced by the IP effect, where (a) is TM and (b) is TE.

FIG. 2 provides the comparison of the response of TE and TM fields before and after influenced by the polarization layer.

The comparison result shows that the TE field is less influenced by the IP effect in the polarization layer, and the difference polarization between the responses is negligible (FIG. 2a); whereas, the corresponding TM field is more influenced by the IP effect in the polarization layer and the response curve shows a significant difference after 1E-2s, especially the appearance of the inverse sign phenomenon, and the TM field is more influenced by the IP effect than the TE field.

Figure 3A:
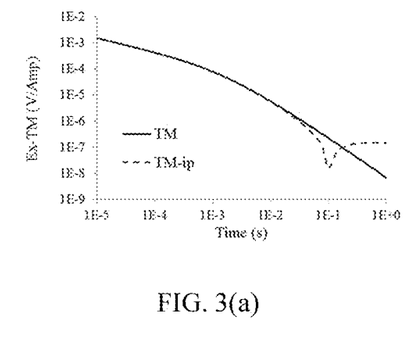
FIGS. 3(a)-(b) show a change of a response of different TE and TM fields (high resistivity polarization layer) influenced by the IP effect, where (a) is TM and (b) is TE.
Figure 3B:
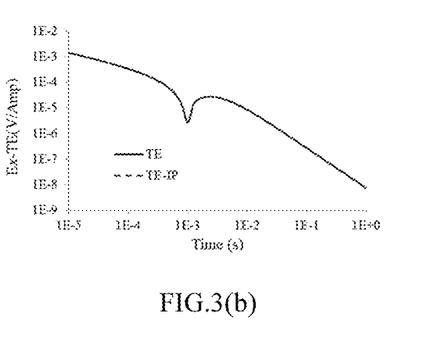

To better analyze the influence of polarization layer resistivity on different types of fields and change polarization layer resistivity, $K: \rho_1=100\ \Omega\cdot m, h_1=500m; \rho_2=1000\ \Omega\cdot m, h_2=20m; \rho_3=200\ \Omega\cdot m.$ Similar to the low resistivity polarization layer, the TE field is hardly influenced by the IP effect of polarization layer, while the TM field is greatly influenced by the IP effect of polarization layer. The deviation time between two curves as well as the negative response phenomenon under the influence of polarization layer is later in the high resistivity polarization layer than the low resistivity polarization layer.

To better analyze the influence of polarization layer parameters on the response, the following different calculations are carried out: m=0.05, 0.2, 0.5, τ=0.001, 0.1, 10 s, c=0.1, 0.25, 0.6.

Figure 4A:
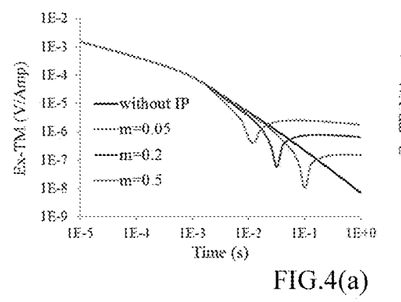
FIGS. 4(a)-(f) show a change of TE and TM fields caused by the IP effect, a change of TE and TM fields caused by (a_b)m parameter, a change of TE and TM fields caused by (c,d)c parameters, and a change of TE and TM fields caused by (e,f) T parameters.
Figure 4B:
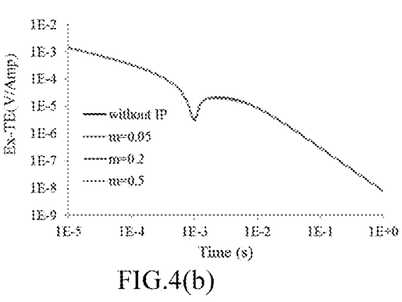
Figure 4C:
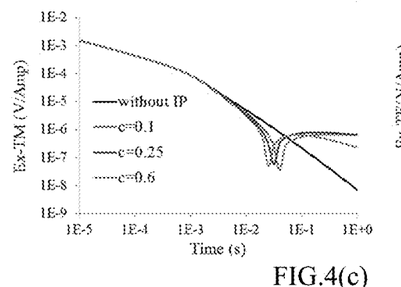
Figure 4D:
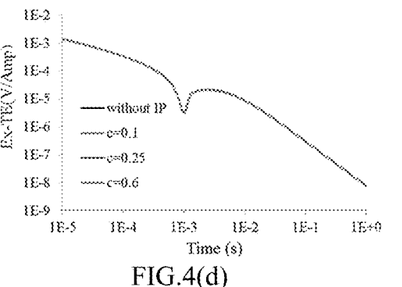
Figure 4E:
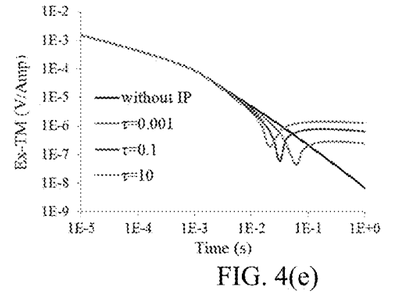
Figure 4F:
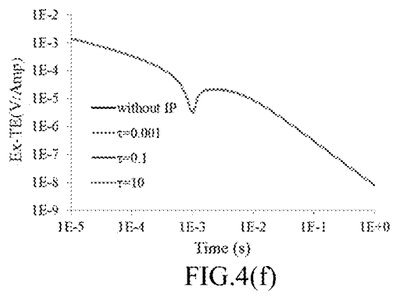

In agreement with the previous results in FIGS. 2 and 3, the TE field is weakly influenced by the IP effect. The change of time constant and frequency dependence does not result in a change of the TE field, and even a change in the polarizability brings little effect (FIGS. 4b, d, f). Unlike the TE field, the TM field is sensitive to polarizability, time constant and frequency domain dependence, and the change of parameters can result in a large change of the TM field. The larger the parameters, the earlier the inverse sign phenomenon appears, and the greater the signal strength brought by the distortion.

Formulae (1) and (2) are used to calculate the vertical magnetic field and horizontal electric field of traditional grounded-wire source with and without a polarization layer, and to analyze the change of electromagnetic field influenced by the IP effect of polarization layer when the ratio of TE and TM fields in layered earth is different.

Figures 5A, 5B:
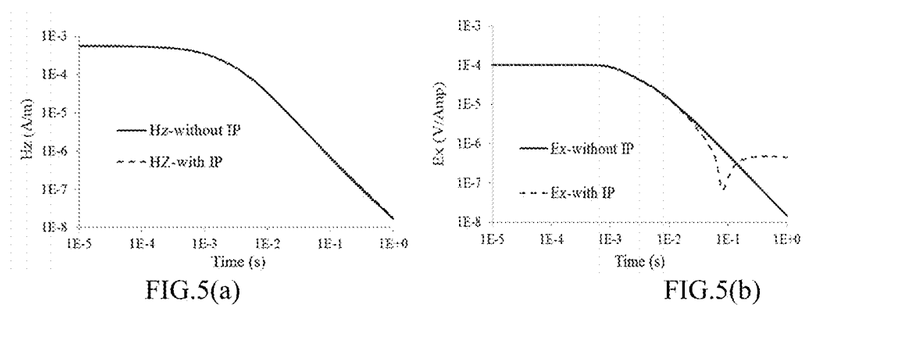
FIGS. 5(a)-(b) show the influence of IP effect of polarization layer on traditional TEM field of grounded-wire source, (a) shows the comparison of vertical magnetic field response influenced by the IP effect; (b) shows the comparison of horizontal electric field response influenced by the IP effect.

As shown in FIG. 5, the vertical magnetic field of a pure TE field is little influenced by the IP effect, with the response curves almost completely overlapped; and the horizontal electric field of grounded-wire source is influenced by the IP effect, with the response curves separated at 1E-2s, and the sign reversed at 1E-1s. The horizontal electric field can be easily influenced by the IP effect.

Figure 6:
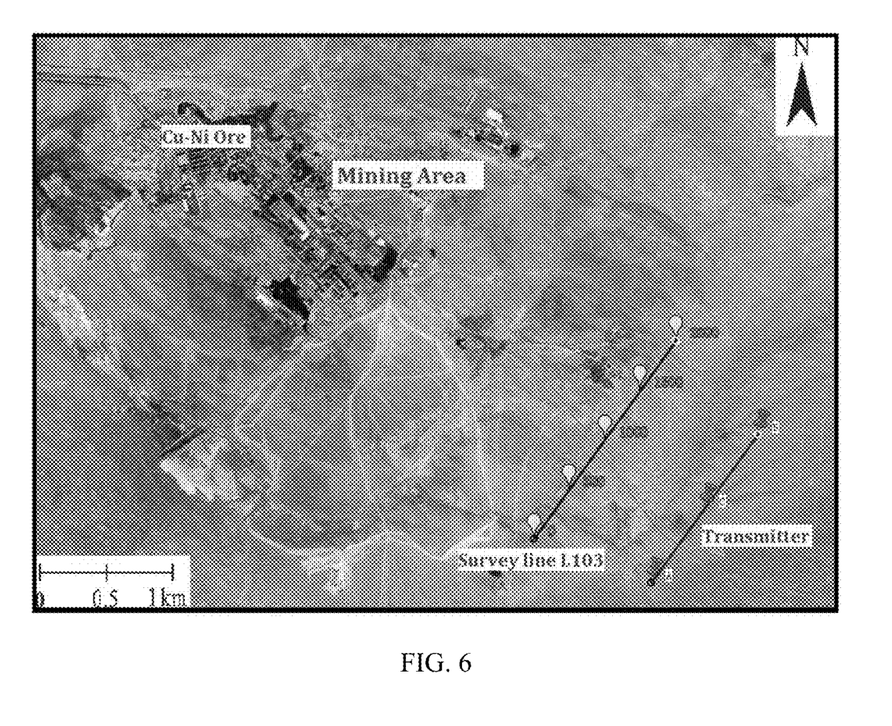
FIG. 6 shows the layout of a survey line.

To better analyze the influence of IP effect of polarization layer on different polarization fields, a Cu—Ni ore concentrated area with a typical polarization layer in Xinjiang is selected for data collection and analysis (FIG. 6).

The outcrop in the area is mainly the Nanmingshui Formation of Lower Carboniferous ($C_1n$), followed by Yunduhala Formation of Middle Devonian ($D_2y$), Honglishan Formation of Paleocene-Eocene of Paleogene ($E_{1-2}h$), and Holocene of Quaternary ($Q_4$). The upper member of Nanmingshui Formation is the surrounding rock of the main ore-bearing rock mass in the area. Both massive Cu—Ni ore and Tertiary has low resistivity (ρ s). In most cases, the Quaternary in surface layer has a relatively high ρ s; while the resistivity of other lithology varies greatly with alteration, metal sulfide content and carbon content. Fresh rock mass and surrounding rock has a high ρ s, while the mineralized rock mass and tuffite containing carbon and pyrite have relatively low ρ s. The ore body, mineralized rock mass and carbonaceous surrounding rock have high polarizability, and the highest polarizability is found in massive ore shoot and surrounding rocks rich in graphite and pyrite. The polarizability of the stratum near the surface, surrounding rocks and rock masses without carbon and pyrite is very low. The Cu—Ni ore body in the mining area is characterized by strong magnetism, high density, high polarizability and low resistivity, which can cause a comprehensive geophysical prospecting anomaly of "three highs and one low" (high gravity, high magnetic force, high polarizability and low resistivity). The properties of high polarizability and low resistivity provide extremely favorable conditions to study the influence of IP effect of polarization body on TEM field.

As shown in FIG. 6, a survey line perpendicular to the vein extension direction is arranged in the southeast of the survey area, and AB represents an emission source. If a dual wire source is used for emission, C at the midpoint is introduced into the emission source as a pole with opposite polarity to A and B. The separation between receiver and transmitter of the survey line L103 is 1000 m, and the base frequency is observed: the vertical magnetic field is mainly 8.3 Hz, and the electric field is observed at the base frequency of 1 Hz. The transmitting current is 10 A, the length of the transmitting line is 1.5 Km, the receiving electrode distance is 40 in, and the effective receiving area of the magnetic rod is 40,000 $m^2$.

Figure 7A:
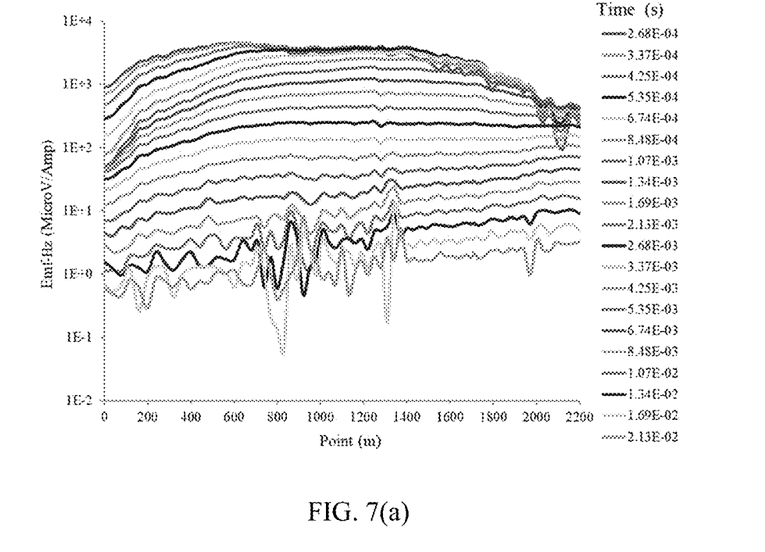
FIGS. 7(a)-(b) are multi-channel diagrams of TEM response of grounded-wire source, where a) is Hz, and b) is Ex.
Figure 7B:
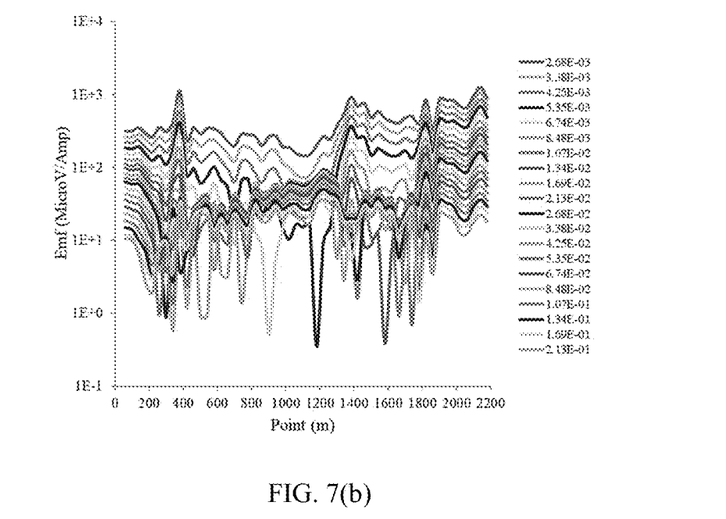

The vertical magnetic field of the wire source shows a monotonically decreasing variation pattern as a whole, and the early data show an increase followed by a decrease at the 1800-2200 observation points (FIG. 7a), which is related to the relative positions of the observation points and the emission source (the planar distribution pattern of the response). The horizontal electric field of the wire source shows a clear inverse sign phenomenon in the range of observation points 400-1200 (FIG. 7b), and the horizontal electric field is significantly influenced by the IP effect and can better distinguish the IP effect.

Figure 8A:
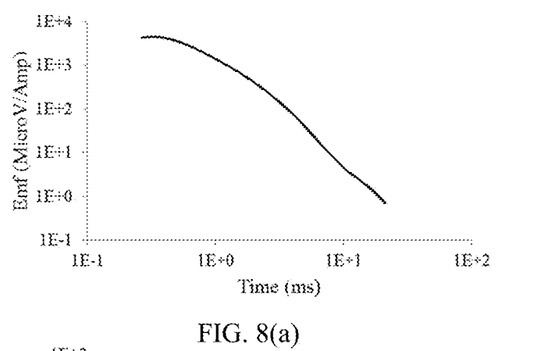
FIGS. 8(a)-(b) are the observed vertical magnetic field and horizontal electric field, where a) is Hz and b) is Ex.
Figure 8B:
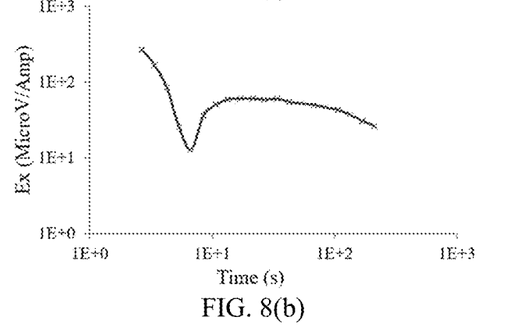
Figure 9A:
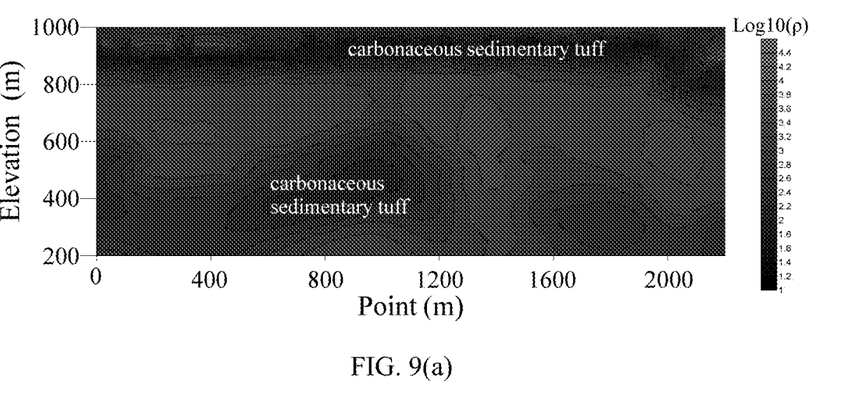
FIGS. 9(a)-(c) are showing the inversion results.
Figure 9B:
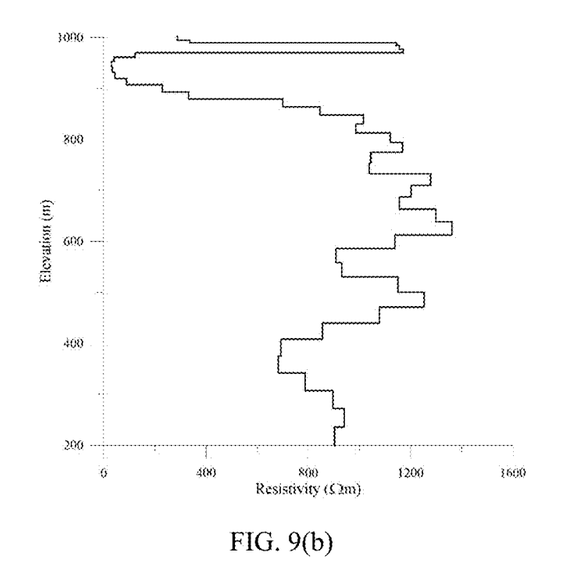
Figure 9C:
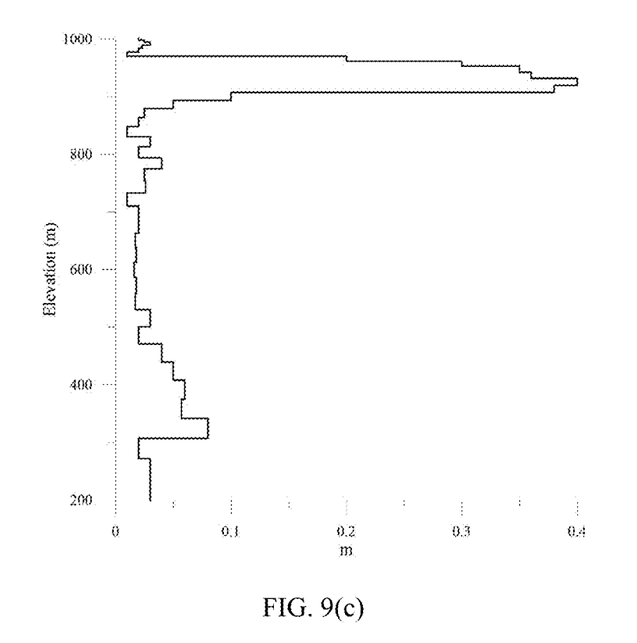
Figure 10:
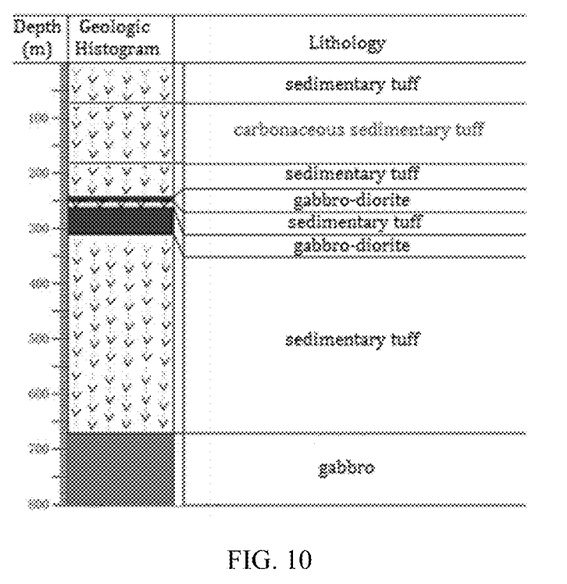
FIG. 10 shows the drilling results.

The observed vertical magnetic field does not show obvious distortion or sign reversal phenomenon, while the corresponding horizontal electric field shows an obvious sign reversal phenomenon. The inverse sign of horizontal electric field of dual wire source occurs at 0.848 ms, an earlier time than 6.74 ms at which the horizontal electric field of single wire source occurs. The inversion results of the data given in FIG. 8 are shown in FIGS. 9b and 9c. The resistivity results obtained through the vertical magnetic field in FIG. 8a are shown in FIG. 9b. Based on the results of resistivity, the electric field data was inverted to obtain the results of polarizability, as shown in FIG. 9c. A low-resistivity and high-polarizability carbonaceous layer has been discovered near an elevation of 950 m. The inverse sign phenomenon of the observed response corresponds to the subsurface carbonaceous tuffite, as shown in FIG. 9a. The extracted resistivity and polarizability information is verified by drilling, as shown in FIG. 10.

The foregoing is only the preferred embodiments of the present invention and is not for use in limiting the present invention. Simple variations or equivalent substitutions of technical solutions that would be obvious to any person skilled in the art within the background art disclosed herein shall fall within the scope of protection of the present invention.

What is claimed is:

1. A method for extracting induced polarization (IP) information in a transient electromagnetic (TEM) response of a grounded-wire source, comprising the following steps:
    1) obtaining subsurface resistivity through inversion of a vertical magnetic field less influenced by an IP effect involves analyzing magnetic field data collected from a grounded-wire TEM method;
    2) obtaining an electric field response not influenced by the IP effect based on forward modeling of the obtained underground electrical structure involves simulating the behavior of electric fields within the subsurface;
    3) removing the influence of the IP effect on an observed response to obtain a pure IP response; and
    4) inverting the obtained IP response to obtain IP information of polarizability, a frequency dependence, and a time constant;
    wherein the method further comprises: applying the IP information of the polarizability, the frequency dependence, and the time constant in exploration of metal minerals and geothermal resources.

2. The method for extracting IP information in a TEM response of a grounded-wire source as claimed in claim 1, wherein a grounded-wire TEM method is mainly used for the observation of a horizontal electric field and a vertical magnetic field, and the expression on surface of uniform layered earth is given as follows:

$$E_x = -\frac{1}{4\pi}\left[\frac{x}{r}\int_0^\infty \left[(1-r_{TM})\frac{u_0}{\hat{y}_0} - (1+r_{TE})\frac{\hat{z}_0}{u_0}\right]J_1(\lambda r)d\lambda\right]_{R'}^{R} - \tag{1}$$

$$\frac{\hat{z}_0 I}{4\pi}\int_{-L}^{L}\int_0^\infty (1+r_{TE})\frac{\lambda}{u_0}J_0(\lambda r)d\lambda dx'$$

$$H_z = \frac{I}{4\pi}\int_{-L}^{L}\frac{y}{r}\int_0^\infty (1+r_{TE})e^{u_0 z}\frac{\lambda^2}{u_0}J_1(\lambda r)d\lambda dx' \tag{2}$$

where, r is distance from a source to an observation point, R and R' are distances from two grounding electrodes to the observation point, 2 L is length of an emission source, $J_1(\lambda r)$ and $J_0(\lambda r)$ are the first-order and zero-order Bessel functions of the first kind respectively, $\lambda$ is a variable related to wave number, $$r_{TE} = \frac{Y_0 - \hat{Y}_1}{Y_0 + \hat{Y}_1}$$

is a reflection coefficient of electromagnetic wave when an electric field component is incident on a plane, $$r_{TM} = \frac{Z_0 - \hat{Z}_1}{Z_0 + \hat{Z}_1}$$

is a reflection coefficient of electromagnetic wave when a vertical magnetic field is incident on a plane, $$Y_0 = \frac{u_0}{\hat{z}_0}$$

is intrinsic admittance of a free space, $\hat{Y}_1$ is subsurface admittance, $$Z_0 = \frac{u_0}{\hat{y}_0}$$

is intrinsic impedance of a free space, $\hat{Z}_1$ is subsurface impedance (the subsurface impedance and the subsurface admittance are recursively obtained from the bottom layer), $\hat{z}_0 = i\omega\mu_0$, $\hat{y}_0 = i\omega\varepsilon_0$, $\omega$ is angular frequency, i is a complex number, $\varepsilon_0$ is a dielectric coefficient of a uniform underground half-space, and $\mu_0$ is permeability of the uniform underground half-space;

$$\hat{Y}_j = Y_j \frac{\hat{Y}_{j+1} + Y_j \tanh(u_j h_j)}{Y_j + \hat{Y}_{j+1}\tanh(u_j h_j)};$$

$$\hat{Y}_N = Y_N;$$

$$\hat{Z}_j = Z_j \frac{\hat{Z}_{j+1} + Z_j \tanh(u_j h_j)}{Z_j + \hat{Z}_{j+1}\tanh(u_j h_j)};$$

$$\hat{Z}_N = Z_N; j = N-1, N-2, \ldots, 1$$

taking $r_{TE}$ and $r_{TM}$ as the basis for judging a transverse electric (TE) polarization field and a transverse magnetic (TM) polarization field, the vertical magnetic field includes the TE polarization field only in the response observed on the layered earth surface, while the horizontal electric field includes both the TM polarization field generated by the grounding term and the TE polarization field excited by the grounding term and the wire source; in order to analyze the different polarization types influenced by the IP effect, taking the horizontal electric field as an example, the expressions of the TE field and the TM field contained therein are extracted respectively;

$$E_{x-TE} = \frac{I}{4\pi}\left[\frac{x}{r}\int_0^\infty (1+r_{TE})\frac{\hat{z}_0}{u_0}J_1(\lambda r)d\lambda\right]_{R'}^{R} - \tag{3}$$

$$\frac{\hat{z}_0 I}{4\pi}\int_{-L}^{L}\int_0^\infty (1+r_{TE})\frac{\lambda}{u_0}J_0(\lambda r)d\lambda dx'$$

$$E_{x-TM} = -\frac{I}{4\pi}\left[\frac{x}{r}\int_0^\infty (1-r_{TM})\frac{u_0}{\hat{y}_0}J_1(\lambda r)d\lambda\right]_{R'}^{R} \tag{4}$$

for a polarization layer, resistivity is converted into complex resistivity by a Cole-Cole model; and the complex resistivity of Cole-Cole model is expressed as:

$$\rho(i\omega) = \rho_0 \left[1 - m\left(1 - \frac{1}{1+(i\omega\tau)^c}\right)\right] \quad (5)$$

where, $\rho_{(i\omega)}$ is dispersion resistivity including the IP effect, ρ0 is zero-frequency resistivity, and in is charge rate or polarizability of a medium; the charge rate affects the intensity of the frequency spectrum rather than the morphology thereof, and is mainly affected by the metal mineral content, mineral density and impregnation degree; r is a time constant, which mainly affects the phase of spectral extreme values and is most influenced by compactness, burial depth and size of ore body under certain conditions; c is a frequency dependence, which determines the expressivity of spectrum characteristics and is mainly affected by burial depth of ore body; a TEM response of an electric-couple source with IP information is obtained through forward modeling of electric-couple source TEM method with the IP effect (forward modeling of firstly solving the frequency-domain electromagnetic method of the same device), replacing the DC resistivity of the formation with the complex resistivity of the Cole-Cole model in the frequency domain, and then performing the sine transform;

the TE field and the TM field in the grounded-wire-TEM are calculated as per Formulae (3) and (4), respectively; and the geoelectric model without a polarization layer is:

$H: \rho_1=100\ \Omega\cdot m, h_1=500m; \rho_2=10\ \Omega\cdot m, h_2=20m; \rho3=200\ \Omega\cdot m.$ 3. The method for extracting IP information in a TEM response of a grounded-wire source as claimed in claim 2, wherein the above parameters take values in the range of: $\rho0=10^{-4}$ to 10 Ω·m, m=0 to 0.98, $10^{-3}$ to $10^5$ s, and c=0.1 to 0.6.

4. The method for extracting IP information in a TEM response of a grounded-wire source as claimed in claim 2, wherein for the geoelectric model with a polarization layer, the second layer is the polarization layer, and the polarization parameters are set as: n=0.1, τ=1 s, and c=0.3; the emission source is 1000 in long, and the emitting current is 10 A.

\* \* \* \* \*